United States Patent [19]
Downs et al.

[11] Patent Number: 6,086,381
[45] Date of Patent: Jul. 11, 2000

[54] INTERACTIVE LEARNING SYSTEM

[75] Inventors: Patrick J. Downs, Rancho Santa Fe; Michael J. Downs, La Jolla; Gerald P. McLaughlin, Rancho Santa Fe; Brian Mihalka, Cardiff, all of Calif.

[73] Assignee: LearnStar, Inc., Irving, Tex.

[21] Appl. No.: 08/922,214

[22] Filed: Sep. 2, 1997

Related U.S. Application Data

[63] Continuation of application No. 08/474,785, Jun. 7, 1995, abandoned.

[51] Int. Cl.⁷ .................................. G09B 3/00; G09B 7/00
[52] U.S. Cl. ......................... 434/322; 434/323; 434/327; 434/335; 434/336; 434/350; 434/351; 434/362
[58] Field of Search ............................... 434/307 R, 322, 434/323, 327, 335, 336, 350, 351, 353, 362

[56] References Cited

U.S. PATENT DOCUMENTS

| | | | |
|---|---|---|---|
| 4,768,087 | 8/1988 | Taub et al. | 348/3 |
| 4,793,813 | 12/1988 | Bitzer et al. | 434/335 |
| 5,273,437 | 12/1993 | Caldwell et al. | 434/351 |
| 5,303,042 | 4/1994 | Lewis et al. | 348/14 |
| 5,437,555 | 8/1995 | Ziv-El | 434/336 |

*Primary Examiner*—Kien T. Nguyen
*Assistant Examiner*—John Edmund Rovnak
*Attorney, Agent, or Firm*—Gardere & Wynne, L.L.P.; Sanford E. Warren, Jr.; Daniel J. Chalker

[57] ABSTRACT

An interactive learning system has an interactive control unit that displays competition or quiz questions in multiple-choice or other format. Students using the system enter answer choices on a wireless keypad. A base station connected to the interactive control unit receives answer choices from and communicates with the wireless keypads. The interactive control unit keeps track of the scores for all users, and scores of different groups of users (i.e., classes).

A receiver connected to the interactive control unit receives content for competitions by satellite broadcast. The competitions are then stored for later use. The system can conduct competitions from those that have been stored or broadcast, or from those that can be created by individual teachers. Previously broadcast and stored competitions can be played simultaneously by a plurality of remote locations, in a "live competition" setting. At the conclusion of the simultaneous competition (or after any previously broadcast and stored competition has concluded), the interactive control unit can connect to the central broadcast facility via modem to transmit scores from classes at the remote location. Then, the central broadcast facility transmits rankings of all participating remote locations for display at each remote location.

17 Claims, 3 Drawing Sheets

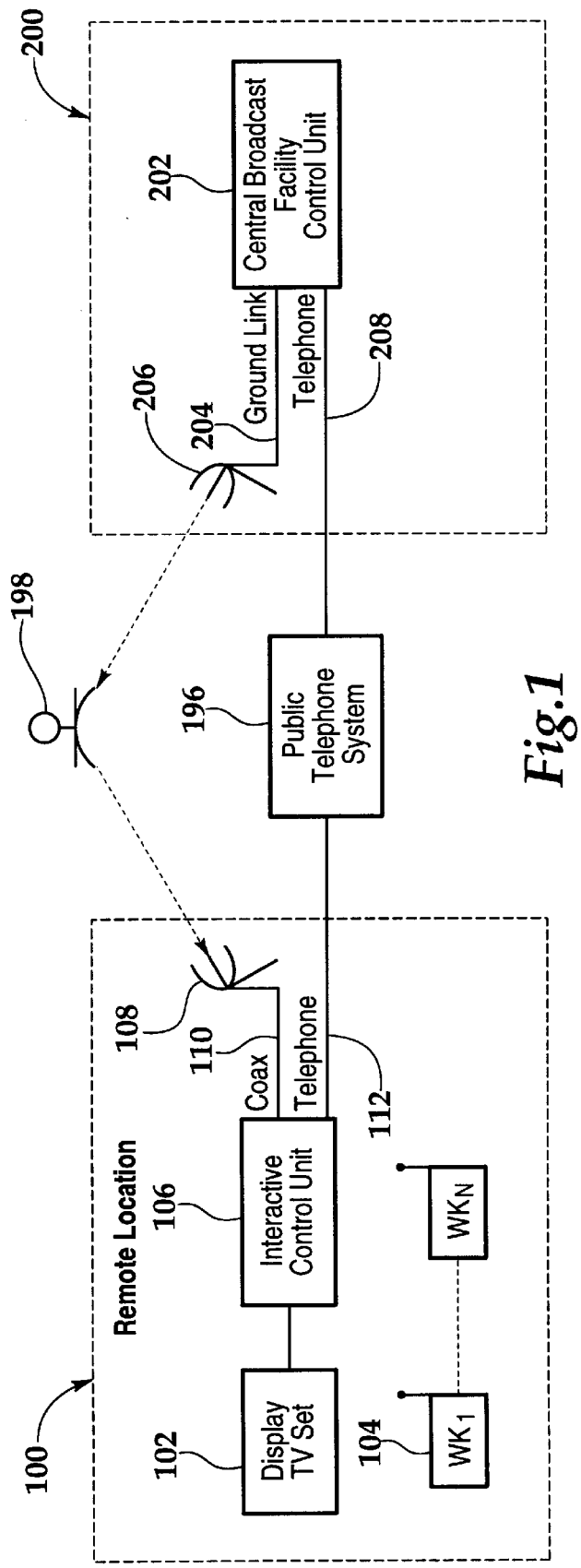
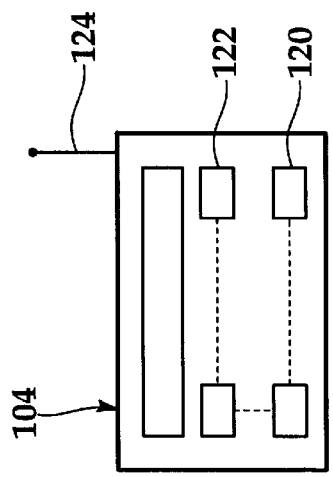
Fig.1
Fig.2

INTERACTIVE LEARNING SYSTEM

This is a continuation of application Ser. No. 08/474,785, filed Jun. 7, 1995, now abandoned.

FIELD OF THE INVENTION

The present invention relates generally to the field of remote learning or teaching systems. More particularly, the present invention relates to an interactive learning system that can display interactive learning content broadcast from a central broadcast location to remote locations, and that can provide simultaneous competitions between participants at remote locations, or that can also provide stand-alone competitions.

BACKGROUND OF THE INVENTION

Many teaching systems for teaching students in remote locations are known in the art. However, none of the prior art teaching systems provide the benefits of the present invention.

U.S. Pat. No. 5,002,491 to Abrahamson et al. discloses an electronic classroom enabling interactive self-paced learning. However, that invention does not permit the connection of teaching systems in remote locations to perform the same lessons and competitions, and for students in remote locations to compete with students in other remote locations.

U.S. Pat. No. 4,793,813 to Bitzer et al. discloses a computer-based education system that includes a plurality of remote locations connected by satellite. However, the system does not permit the feedback of lesson or competition scores where groups of students in remote locations compete with one another.

U.S. Pat. No. 4,785,472 to Shapiro discloses a remote teaching system. However, the system does not permit a plurality of students in a remote location to interact with a lesson or competition displayed in a classroom. Additionally, the system does not permit the connection of a plurality of remote locations whereby competitions can be performed simultaneously and scores can be ranked with other remote locations.

Thus, there exists a need for a teaching system that is interactive, that can present the same competition or quiz material at various remote locations, and that can keep track of competition scores of students at remote locations and rank them according to scores, enabling widespread interactive learning competition.

SUMMARY OF THE INVENTION

The interactive learning system of the present invention can be used in schools, including traditional schools and vocational schools. It can also be used for corporate training purposes, among many other uses.

In an exemplary embodiment, students in a remote location, such as a school classroom, view a large display television set. The display television set is used to display competitions or quizzes consisting of a series of questions on a particular subject. With or after the question, there appears a series of answer choices in a multiple choice format. The competition is stored in and conducted by an interactive control unit.

Each student viewing the display television set is equipped with a wireless keypad which the student uses to respond by pressing the appropriate key. The wireless keypad sends the response to a base station receiver connected to the interactive control unit. The interactive control unit then directs the base station to transmit a message back to each keypad indicating that its answer has been received. The interactive control unit then calculates which of all the answers are correct and which are incorrect. These results are then displayed on the display television set along with the correct answer. Then, the next question is displayed. Questions can be displayed, and points awarded, in a variety of formats.

The competitions can be displayed, and points awarded, in a variety of formats. For example, presentation of competition questions can include clues and facts relevant to a question being displayed. Additionally, students can be awarded more points by answering questions quickly, or by answering before subsequent clues are displayed. Also, the correct answer and scores of all participants can be displayed after each question, or after the end of the competition.

The competitions can be conducted in many ways. The contents of competitions are broadcast from a central broadcast facility by direct broadcast satellite to a plurality of remote locations, such as other schools around the country. Competitions are then stored in the interactive control unit for use at a later time. A teacher can later call up any competition for use at any time. Also, the system can be scheduled from the central broadcast facility to conduct a specific competition at a scheduled time.

The system can also be used to conduct live simultaneous academic competitions in which a plurality of remote locations compete among themselves. At the conclusion of the simultaneous competition, the participating remote locations transmit score results via telephone to the central broadcast facility. Computers at the central broadcast facility then calculate the reported scores from participating locations and rank the remote locations. These results are then broadcast via satellite to the remote locations shortly after the conclusion of the simultaneous competitions.

Additionally, the system permits teachers to create their own competitions for use on the system, or to edit or modify existing competitions sent from the central broadcast facility and stored in the interactive control unit. Custom competitions can also be created on a separate computer and then uploaded into the interactive control unit by a floppy disk drive.

The system can also make use of a CD-ROM containing multimedia or other information (such as a graphic, full video, audio, etc.) to be displayed that is relevant to the nature of the question being displayed.

These as well as other features of the invention will be described in greater detail below.

BRIEF DESCRIPTION OF THE DRAWINGS

A preferred embodiment of the system and method of the present invention is illustrated in and by the following drawings, in which like reference numerals indicate like parts and in which:

FIG. 1 is a block diagram illustrating the interactive learning system of the present invention;

FIG. 2 is a diagram of an exemplary embodiment of a wireless student keypad;

DETAILED DESCRIPTION OF THE PREFERRED EMBODIMENTS

Figure 3:
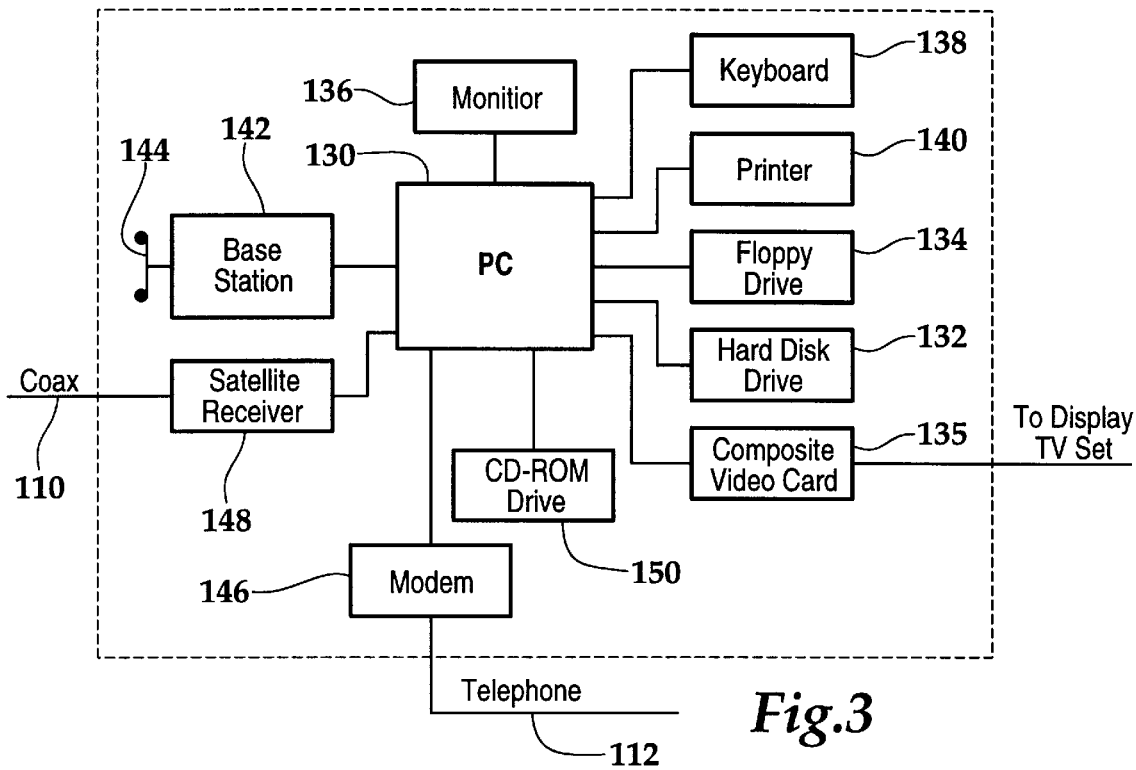
FIG. 3 is a diagram of the interactive control unit.

An exemplary embodiment of the interactive learning system of the present invention is shown in FIG. 1. A remote location is illustrated at 100. The remote location 100 can be any location where educational activities can take place. A typical remote location 100 is a school, but could also be a vocational school or corporate training facility.

Each remote location 100 is equipped with a display television set 102. Interactive competitions are displayed on the display television set 102 as a series of questions displayed in multiple-choice format, whereby several answer choices are displayed with or immediately after the question. Additional information can be displayed with or immediately after each question, such as answer clues and any additional information relating to the question.

The competitions are displayed to a plurality of students, preferably in a single classroom. All students are given a period of time to select an answer to each question. Each answer choice is labeled (e.g., 1–5, or a–e, etc.). Students select their answer through a wireless keypad 104. Each student or team of students is assigned an independent wireless keypad 104. A plurality of wireless keypads 104 are shown in FIG. 1, labelled WK1 through WKN, where N represents the total number of wireless keypads 104. Students enter the desired answer by depressing the key on the wireless keypad 104 that corresponds to the answer the student has selected.

Competitions are controlled by an interactive control unit 106. The interactive control unit 106 stores competitions and displays them on the display television set 102. The interactive control unit 106 also communicates with the wireless keypads 104, to associate selected answers with individual students or teams of students.

Competitions controlled by the interactive control unit 106 are input in one of two principal ways. In one way, a teacher creates a competition on the interactive control unit 106 itself (when it is not being used to run a competition) or creates them on a stand-alone personal computer and loads them via a floppy disk. The other principal way to input competitions into the interactive control unit 106 is for the interactive control unit 106 to receive competitions broadcast by satellite from a central broadcast facility 200. Employees at the central broadcast facility create educational competitions for use at all remote locations and load them into a central broadcast facility control unit 202. At prearranged broadcast times, the central broadcast facility 200 will broadcast the data for the competitions via satellite (for example). For this purpose, the central broadcast facility control unit 202 is connected to a ground link 204 (such as a leased telephone line) terminating at a satellite uplink 206. The satellite uplink 206 can be located remote from the central broadcast facility 200 or at the central broadcast facility 200 itself. The satellite uplink 206 uplinks the competition data to a satellite 198 for broadcast to remote locations. The satellite uplink 206 and satellite broadcast can be carried on the KU band, or by any other suitable way of broadcasting.

At the prearranged broadcast times, each remote location 100 is adapted to receive the satellite broadcast. For this purpose, each remote location 100 has a satellite dish antenna 108 adapted to receive the broadcasts over the KU band. The KU band prefers that the dish antenna 108 be only approximately 30 inches in diameter. The dish antenna 108 is connected via a coaxial cable 110 to a receiver in the interactive control unit 106. The interactive control unit 106 stores the broadcast competition data for later use.

The competitions broadcast from the central broadcast facility 200 ("broadcast competitions") are common to all remote locations. Thus, these competitions may be used for remote locations to compete against one another. Some of these competitions between remote locations can be used for simultaneous or "live" competitions. The remote locations can play the previously broadcast and stored competitions at a time scheduled by the central broadcast facility 200. At the conclusion of the live competition, each participating remote location reports the scores of its participants and other statistical information to the central broadcast facility 200. For this purpose, the interactive control unit 106 is connected via a telephone line 112 to a conventional public telephone system 196. The interactive control unit 106 uses the telephone line and a modem to connect with the central broadcast facility 200.

The central broadcast facility control unit 202 contains a modem connected to a telephone line 208, which is connected to the public telephone system 196. Once all participating remote locations have contacted the central broadcast facility 200 via telephone to report scores (this should only require a few minutes), the central broadcast facility control unit 202 then ranks the remote locations by highest scores. The rankings information is then transmitted via satellite broadcast (the same as how data for competitions is broadcast) to the remote locations. Thus, the remote locations are provided with rankings of all participating remote locations shortly after the conclusion of the live or simultaneous competition.

Live or simultaneous competitions need not be truly "live," because the information for a live competition, just like the information for other competitions coming from the central broadcast facility 200, is provided to the interactive control unit 106 in advance of the time for the live competition. Scores from the live competition are transmitted by the interactive control unit 106 via telephone at the conclusion of the competition. Ranking and other information from other remote sites for the same competitions can be transmitted from the central broadcast facility 200 to the remote site during the telephone call, rather than by satellite broadcast. Thus, each remote location can play the previously broadcast and stored competitions at its own time, rather than at a prescheduled time for all remote locations. At the conclusion of the competition, the scores can be sent to the central broadcast facility 200 by telephone. The central broadcast facility control unit can add the scores to its database for that competition and transmit back via the telephone line rankings for other remote locations that have previously played the competition and reported their scores (either weeks before or minutes before). This rankings information is then displayed for the class that just played the competition. This gives the appearance of a live competition, but offers flexibility in timing to the remote location 100. Each remote location can play the competition, report scores, and retrieve rankings when convenient.

Scores of previously broadcast and stored competitions need not be called back and reported at the conclusion of each such competition. Instead, such scores can be stored by the interactive control unit 106. Then, the next time the interactive control unit 106 reports scores for a given competition by telephone, the interactive control unit 106 can also report scores for other previously broadcast and stored competitions that have not been reported. In this way, the database of scores and rankings of competitions can be kept up to date at the central broadcast facility control unit 202.

As has been described, competitions that have been broadcast to remote sites from the central broadcast facility 200 and stored in the interactive control unit 106 can be used at any desired time. Individual student scores and overall class scores are available on-screen or can be printed out. For competitions that have been sent by the central broadcast facility, students can be provided with rankings of their class against other classes at their remote location 100 as well as other classes at other remote locations that have previously played the same competition.

Referring now to FIG. 2, an exemplary wireless keypad 104 is shown. Any number of wireless keypads 104 can communicate with the interactive control unit 106. Wireless communication is preferably accomplished by use of standard FM cordless telephone frequencies (e.g., 49 MHz). FM cordless telephone transceiver circuits are well known in the art.

Each wireless keypad preferably consists of a small computer (microprocessor), 40-key keyboard 120, a two-line, 48-character illuminated LCD display 122, and a two-way radio transceiver which communicates with the interactive control unit 106 by a flexible rubber antenna 124 of approximately 7 inches in length (similar to an antenna found on some cordless phones). The keyboard 120 is a membrane-type keyboard, which is dirt-proof and waterproof, and is highly resistant to tampering and abuse. The flexible rubber antenna 124 provides a safe, durable transmission system for the internal radio transceiver. Each wireless keypad 104 is preferably provided with an internal rechargeable nickel-cadmium battery pack. Battery power may be conserved by inactivity or by an auto-shutoff feature when the wireless keypads 104 are inserted into a charger.

Referring now to FIG. 3, the components of the interactive control unit 106 are depicted. The interactive control unit 106 preferably contains a high performance personal computer system ("PC") 130. The PC 130 is used to control stand-alone competitions (i.e., not conducted live or simultaneously) and competitions (live or otherwise) broadcast via satellite from the central broadcast facility 200. The interactive control unit 106 is used to create new competitions (i.e., teacher-created competitions) and to receive, store and play teacher-created competitions and competitions broadcast from the central broadcast facility 200 via satellite. Competitions are stored on a hard disk drive 132. Competitions can also be provided in a standard library format from the central broadcast facility, by being preloaded onto the hard disk drive 132 of the interactive control unit 106 prior to initial installation at the remote location 100, or by subsequent loading via a floppy disk drive 134. The floppy disk drive 134 can be used also to load teacher-created competitions that have been created on other computers. Competitions can be created on a stand-alone, separate computer (such as a teacher's computer at home or at school). Competitions can be saved to floppy disk and then be imported to the interactive control unit through the floppy disk drive 134. The floppy disk drive 134 can also be used to archive competitions and/or results of competitions to floppy disk drives 134 for safekeeping.

All competitions are displayed on the display television set 102, which is driven by a composite video card 135 installed in the PC 130. A separate color VGA monitor 136 and keyboard 138 are connected to the PC 130 for control of the interactive control unit 106, for such activities as running competitions, editing and creating competitions, and viewing and printing competitions and results of competitions. The PC 130 contains VGA graphics capabilities to support the monitor 136.

A printer 140 attached to the interactive control unit 106 can be used to print out results and rankings of competitions that have been played. The printer 140 can also be used to print out the content of any competitions stored on the interactive control unit 106.

The interactive control unit 106 also has a base station 142 for communicating with the wireless keypads 104 that the students use to input their answers to competition questions. The base station 142 and wireless keypads 104 are connected by any method, including but not limited to two-way radio communication. Two-way radio communication can be accomplished by any known method or technology, including but not limited to well-known cordless telephone technology. The base station 142 transmits messages to the LCD on each wireless keypad 104. All radio signals are transmitted and received by an antenna 144 on the base station 142 that connects to the PC 130. The antenna 144 is preferably a dipole antenna. The base station 142 is connected to the PC 130 by any suitable means, such as an RS-232 serial port.

Because all of the wireless keypads 104 communicate with the interactive control unit 106 on the same channel, the wireless keypads 104 can transmit to the interactive control unit 106 (via base station 142) only one at a time. This can be accomplished by any conventional method, such as by polling each wireless keypad 104 or by assigning known time slices to each wireless keypad 104. The base station 142 begins each of its transmissions by addressing specific wireless keypads 104 (or all keypads, if desired) in order to designate the specific wireless keypad(s) 104 to receive information about to be transmitted, such as information to be displayed on the wireless keypad's 104 display.

As previously described, the interactive control unit 106 communicates with the central broadcast facility 200 via satellite and telephone modem 146. The telephone modem 146 is connected to the PC 130 and to the telephone line 112. All satellite broadcast signals are received in the interactive control unit 106 by a connected satellite receiver 148. The receiver is preferably mounted inside the interactive control unit 106. The interactive control unit 106 is configured to display messages on the monitor 136 to indicate when the interactive control unit 106 is receiving and processing data broadcast via satellite from the central broadcast facility 200.

The interactive control unit may also be provided with a CD-ROM drive 150 containing a CD-ROM for the application of multimedia during the presentation of competitions. The multimedia system can provide full motion, full-screen video with audio that plays through the speakers of the display television set 102 or through other speakers connected to the PC 130. The video and audio material are located on the CD-ROM, and competitions that are broadcast from the central broadcast facility 200 or that are teacher-created can make use of the material on the CD-ROM. Another potential application of the CD-ROM drive 150 is to access a multimedia encyclopedia on the CD-ROM for an article, graphic or other information relating to the subject matter of a particular question or competition.

As an example of the application of the CD-ROM drive 150, a competition on the human anatomy could display an animated graphic of the human heart showing blood flow and all of the various chambers of the heart operating. The questions about the heart's function could be displayed along with the graphic. The same would be true of a question on mathematics, jet propulsion, geography, or any other subject which can be illustrated by graphic material from a CD-ROM. The competition content, encoded to access the CD-ROM, could be sent by satellite to the remote locations, either for simultaneous competition or for prerecording and later use. Competitions using the CD-ROM drive 150 could also be created by teachers themselves.

Figure 4:
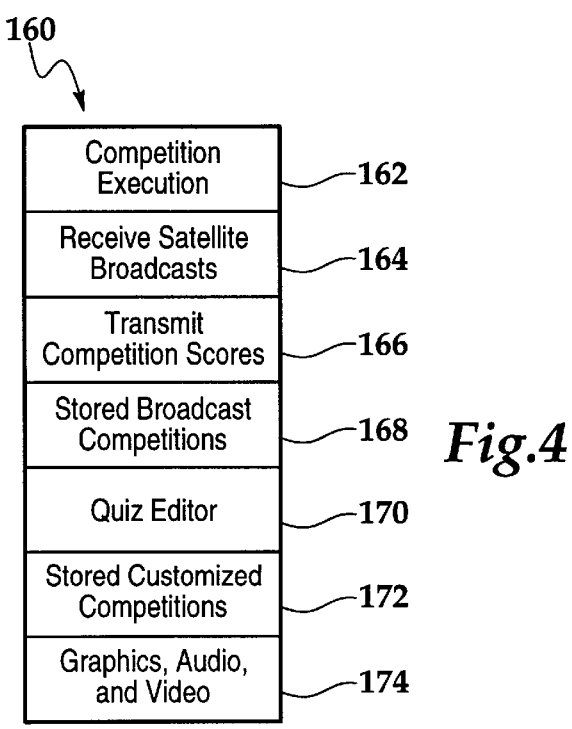
FIG. 4 is an exemplary diagram of items stored in the interactive control unit.

Referring now to FIG. 4, an exemplary diagram of items stored in the interactive control unit 106 (e.g., the hard disk drive 132) is shown. A portion of storage begins at 160. One item in storage (shown at 162) is program instructions for executing the competitions (i.e., displaying questions, accepting answers, scoring, etc.). Another item (shown at 164) is program instructions for receiving satellite broadcasts from the satellite receiver 148. An additional item (shown at 166) is program instructions for transmitting competition scores to the central broadcast facility 200. Stored broadcast competitions 168, and graphics, audio and video 174, are stored when received from satellite broadcast and are saved for future use.

Also included in storage for the interactive control unit 106 is program instructions for editing or creating quizzes (shown at 170). Through the quiz editor 168, the interactive control unit 106 offers the capability for the teacher to alter the content of a competition provided from the central broadcast facility 200 by altering the content of a competition to specifically suit his or her lesson plans. For example, a teacher could select a competition on the subject of the Civil War from the library of competitions (stored at 168) supplied from the central broadcast facility 200. The teacher could then add or delete questions, thereby creating a customized competition that can be played.

Another item in storage in the interactive control unit 106 are folders or directories for storing the customized competitions 172. The original versions of competitions remain in separate storage in the system, for others to use and/or customize themselves. Customized competitions are stored on the hard disk drive using a file cabinet, file drawer, or file folder approach which allows easy retrieval, editing, and playing of a teacher selected competition. To edit or play a personally created competition, for example, a teacher simply opens his or her personal file drawer where their class subject folders (previously created by the teacher) are stored. Each folder contains competitions that are related to the folder's subject. For instance, a teacher named Mr. Smith would retrieve his Algebra 1 competition (so that he could edit or play it) by opening his file drawer named Smith and opening the folder therein named Math. Mr. Smith could also retrieve a competition from the library provided from the central broadcast facility 200 (stored at 168), change it in any way he wished, and then save it in an appropriate folder located in his personal file drawer. Consequently, any teacher can modify a library competition while leaving the original version in the library for other teachers to use unchanged.

Figure 5:
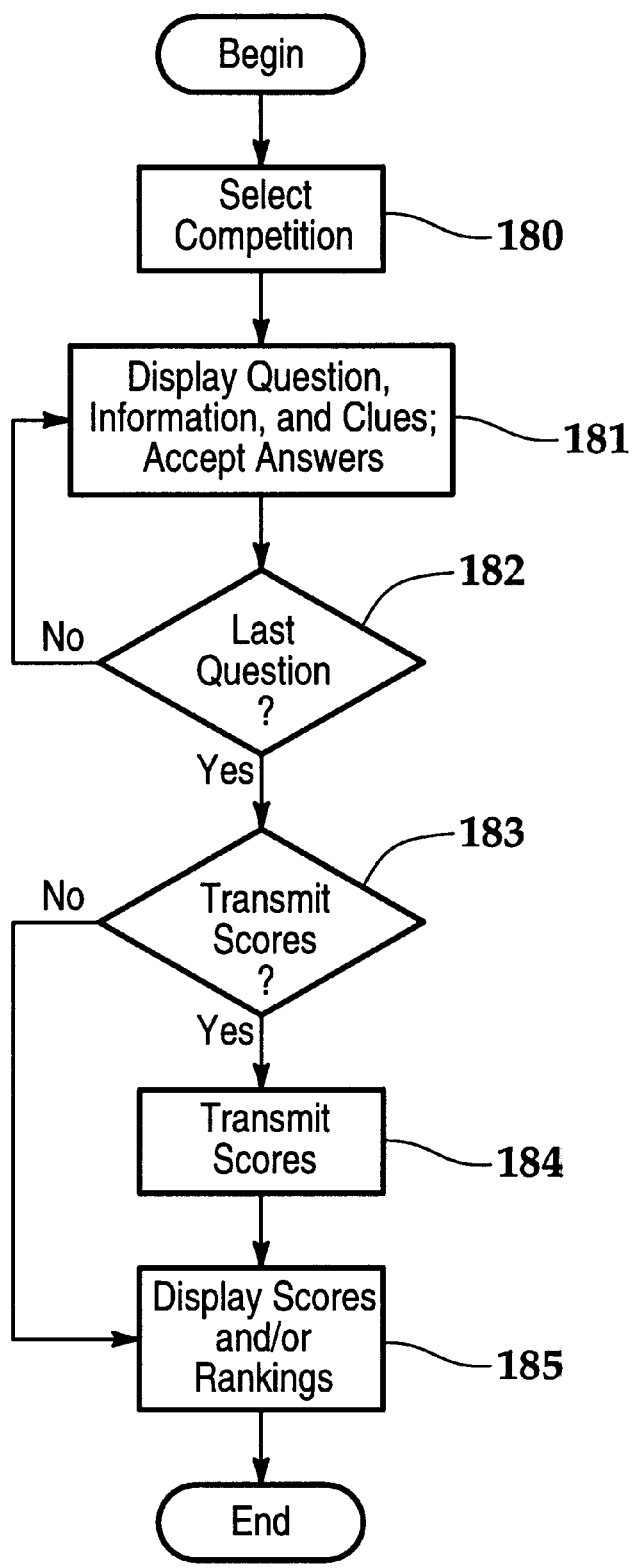
FIG. 5 is a flow chart illustrating the operation of the interactive learning system in the interactive control unit.

Referring now to FIG. 5, a flow chart illustrating the operation of the interactive learning system in the interactive control unit 106 is shown. Execution begins at 180 where the teacher selects a competition to be played. Alternatively, the interactive control unit 106 could be programmed to play a competition at a preset time, such as in a live or simultaneous competition. At 181, each question is displayed on the display television set 102. Additionally, any clues or additional information to be displayed with the question are displayed. Also, answer choices are displayed, and answer selections are received from the wireless keypads 104. However, the answer format is not limited to a multiple choice format. Students can enter sentences, phrases, names, titles, etc., on the wireless keypads 104 in response to questions.

The interactive control unit 106 will count the appropriate time for responses, and keep track of scores. Following the time period for selecting answer choices, the correct answer can be displayed, as well as a scoreboard to provide instantaneous feedback regarding student progress. Additionally, personalized feedback can be provided on each wireless keypad 104 LCD display, which can be used to prompt students for their answers, indicates the correct answer at the end of each question round, and displays student scores and ranking.

At 182, a determination is made whether the last question has been displayed. If not, the interactive control unit 106 returns to 181.

Once the last question has been displayed, a determination is made at 183 as to whether scores are to be transmitted. If the competition was a live or simultaneous competition, or was another competition where the students are to be ranked with students at other remote locations, the scores are transmitted at 184. Whether or not scores are transmitted, at 185, scores of students in the classroom at the remote location can be displayed on the display television set 102. At the end of a competition, students will see rankings of final scores within the classroom of the students or student teams that just played in the classroom competition. Also, the students will be provided with a ranking of their class among other classes that have played the same competition at the remote location. If the competition was one provided by the central broadcast facility 200, and was not created or modified by a teacher (meaning that scores were transmitted at 184), the students will also be provided a display of the ranking of the remote location's score with scores of other classes at other remote locations that have played the same competition.

Exemplary subjects for middle school or high school competitions are American Government, Earth Sciences, Economics, English, Geography, Life Sciences, Math, Physical Sciences, Spanish/English as a Second Language; U.S. History, and World History. Competitions can be provided in any format suitable for presenting the series of questions and answers that form competitions. As an example, competitions may consist of 10 questions which take 5 to 8 minutes to play, depending upon the teacher-selectable competition format used. Exemplary competition formats are "Countdown," "Wipeout," Lightning Round," or "Quiz," described below.

The interactive control unit allows competitions to be created or modified in many respects. Questions can be deleted, added or modified. In other respects, before a competition is played, a teacher can modify the competition's display format and set the time allowed for question display and response time by class period. In addition, a teacher can either prename student teams or allow students to name their own teams, through use of the wireless keypads 104. Once a competition begins playing, the teacher can pause or terminate play at any time. After a competition is finished, team scores and class rankings are automatically saved on the hard disk drive for later review and/or printing.

Competition Display Formats

A competition or quiz consists of a question followed by a number of answer choices. Some competition formats may use clues to aid students in selecting their answers. In addition, facts are sometimes used to provide additional information about a question or to explain why a particular answer is correct. Teachers can select display formats at the time a competition is played. The following are examples of competition display formats that can be used. All of these examples are intended to show the broad range of formats available. The following specific examples are not intended to be limited to the specific characteristics. Many modifications are possible, including but not limited to graphics, full motion video, and audio.

"Countdown" (question, answer choices, clues, correct answer and fact):
1. Each question is displayed on the display television set with possible answer choices;
2. Students have a brief amount of time to answer correctly and can receive up to 1000 points;
3. Up to three clues then appear as point value counts down to zero over a preset period of time;
4. The correct answer is displayed when the point value reaches zero;
5. A fact is then displayed; and
6. A scoreboard appears indicating the answer that each team gave, points received for the question, and total points accumulated.

"Wipe Out" (question, answer choices, correct answer and fact):
1. Each question is displayed on the display television set with possible answer choices;
2. Students have a brief amount of time to answer correctly and can receive up to 1000 points;
3. Point value counts down to zero over a preset period of time, and incorrect answers are periodically wiped from the display;
4. The correct answer is displayed when the point value reaches zero;
5. A fact is then displayed; and
6. A scoreboard appears indicating the answer that each team gave, points received for the question, and total points accumulated. "Lightning Round" (question, answer choices, and correct answer, but no clues or facts):
1. Each question is displayed on the display television set with possible answer choices;
2. Students have a brief amount of time to answer correctly and can receive up to 1000 points;
3. Point value quickly counts down to zero over a short preset period of time;
4. The correct answer is displayed when the point value reaches zero;
5. A scoreboard only appears after every third question and indicates the answer that each team gave, points received for the question, and total points accumulated.

"Quiz" (question and answer choices, but no correct answer, clues, fact or scoreboards):
1. Each question is displayed on the display television set with possible answer choices;
2. Students have a brief amount of time to answer correctly and can receive up to 1000 points;
3. Scores are saved for later review by the teacher.

What is claimed is:
1. An interactive learning system, comprising:
an interactive control unit at a remote location for receiving, storing and displaying questions on a display television set at said remote location and for receiving, storing and analyzing user answer choices to said questions;
a plurality of wireless keypads for users to enter said answer choices;
said interactive control unit comprising a computer, a base station connected to said computer for receiving said user answer choices from said wireless keypads and sending said user answer choices to said computer, a broadcast receiver connected to said computer for receiving broadcasts containing a series of questions from a central broadcast facility and sending said broadcasts to said computer, and a modem connected to said computer for transmitting statistics based on said user answer choices to said central broadcast facility after said users have entered said answer choices to all questions within said broadcast; and
wherein said interactive control unit permits a teacher to modify said series of questions sent from said central broadcast facility.

2. The interactive learning system of claim 1, additionally comprising:
a floppy disk drive connected to said computer for loading questions created independently of said broadcast sent from said central broadcast facility.

3. The interactive learning system of claim 1, wherein the interactive control unit permits said teacher add and delete questions from said series of questions sent from said central broadcast facility.

4. The interactive learning system of claim 1, additionally comprising:
a CD-ROM drive connected to said computer for loading multimedia presentations to be displayed in combination with said questions.

5. The interactive learning system of claim 1, additionally comprising:
a storage device connected to said computer for electronically organizing and storing said questions.

6. The interactive learning system of claim 1, wherein said questions are part of a competition between said users.

7. The interactive learning system of claim 6, wherein said competition is presented in a countdown format.

8. The interactive learning system of claim 6, wherein said competition is presented in a wipe out format.

9. The interactive learning system of claim 6, wherein said competition is presented in a lightning round format.

10. The interactive learning system of claim 6, wherein said competition is presented in a quiz format.

11. An interactive learning system, comprising:
an interactive control unit at two or more remote locations for receiving, storing and displaying questions on a display television set at each said remote location and for receiving, storing and analyzing user answer choices to said questions;
said questions being part of a competition between said two or more remote locations;
a plurality of wireless keypads for users to enter said answer choices;
a base station at each said remote location and connected to said interactive control unit for receiving said user answer choices from said wireless keypads and sending said user answer choices to said interactive control unit;
a broadcast receiver at each said remote location and connected to said interactive control unit for receiving broadcasts containing a series of questions from a central broadcast facility and sending said broadcasts to said interactive control unit; and
a modem at each said remote location and connected to said interactive control unit for transmitting statistics based on said user answer choices to said central broadcast facility after said users have entered said answer choices to all questions within said broadcast.

12. The interactive learning system of claim 11, additionally comprising:
   a CD-ROM drive connected to said interactive control unit for loading multimedia presentations to be displayed in combination with said questions.

13. The interactive learning system of claim 11, additionally comprising:
   a storage device connected to said interactive control unit for electronically organizing and storing said questions.

14. The interactive learning system of claim 11, wherein said competition is presented in a countdown format.

15. The interactive learning system of claim 11, wherein said competition is presented in a wipe out format.

16. The interactive learning system of claim 11, wherein said competition is presented in a lightning round format.

17. The interactive learning system of claim 11, wherein said competition is presented in a quiz format.

* * * * *

UNITED STATES PATENT AND TRADEMARK OFFICE
CERTIFICATE OF CORRECTION

PATENT NO.    : 6,086,381
DATED         : July 11, 2000
INVENTOR(S)   : Downs et al.

It is certified that error appears in the above-identified patent and that said Letters Patent is hereby corrected as shown below:

Title page,
Item [73], Assignee, delete "LearnStar, Inc., Irving, Tex." and insert -- NTN Communications, Inc., Carlsbad, Calif. --

Signed and Sealed this

Twenty-seventh Day of July, 2004

JON W. DUDAS
*Acting Director of the United States Patent and Trademark Office*